US008064182B2

(12) United States Patent
Baker et al.

(10) Patent No.: US 8,064,182 B2
(45) Date of Patent: Nov. 22, 2011

(54) OVERVOLTAGE PROTECTION PLUG

(75) Inventors: Scott K. Baker, Richfield, MN (US); Cyle Petersen, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 685 days.

(21) Appl. No.: 11/712,234

(22) Filed: Feb. 28, 2007

(65) Prior Publication Data

US 2008/0204963 A1 Aug. 28, 2008

(51) Int. Cl.
*H02H 3/22* (2006.01)

(52) U.S. Cl. ........................................................ 361/120

(58) Field of Classification Search .................. 361/120
See application file for complete search history.

(56) References Cited

U.S. PATENT DOCUMENTS

D215,545 S 10/1969 Huska
4,086,648 A * 4/1978 Hines et al. .................. 361/124
4,345,294 A 8/1982 Forberg et al.
4,420,200 A 12/1983 Forberg et al.
4,420,892 A 12/1983 Braun et al.
D273,104 S 3/1984 Cousins
4,434,542 A 3/1984 Forberg et al.
4,502,088 A 2/1985 Baumbach
4,594,635 A 6/1986 Scheithauer et al.
4,626,955 A 12/1986 Cwirzen
4,642,723 A 2/1987 Achtnig et al.
4,649,456 A 3/1987 De Luca et al.
4,741,711 A 5/1988 Singer, Jr.
4,759,726 A 7/1988 Naylor et al.
4,871,330 A 10/1989 Muller et al.
4,882,748 A 11/1989 Meyerhoefer
4,887,183 A 12/1989 Biederstedt et al.
4,958,253 A 9/1990 Gilberts et al.
4,964,160 A 10/1990 Traube et al.
4,986,768 A 1/1991 Bramkamp et al.
5,033,974 A 7/1991 Biederstedt et al.
5,086,368 A 2/1992 Gerke et al.

(Continued)

FOREIGN PATENT DOCUMENTS

CA 1333409 12/1994

(Continued)

OTHER PUBLICATIONS

U.S. Appl. No. 29/318,746, Petersen, filed May 27, 2008.

(Continued)

*Primary Examiner* — Rexford Barnie
*Assistant Examiner* — Ann Hoang
(74) *Attorney, Agent, or Firm* — Merchant & Gould P.C.

(57) ABSTRACT

An overvoltage protection plug is disclosed. The plug includes a housing forming a body, a handle, and an insertion portion. The plug further includes a circuit board mounted at least partially within the body. A portion of the circuit board protrudes from the housing at the insertion portion and includes metallic connection pads configured for interconnection to a connection block. The plug also includes a gas tube mounted to the circuit board and residing within the housing, the gas tube electrically connected to the metallic connection pads by a plurality of circuit traces on the circuit board. The handle of the housing can extend rearward from a top edge of the housing. The body can include an interior cavity having generally parallel side walls including a thinned region surrounding the gas tube. A circuit connection block assembly is also disclosed.

22 Claims, 19 Drawing Sheets

U.S. PATENT DOCUMENTS

| | | | | |
|---|---|---|---|---|
| 5,155,649 | A * | 10/1992 | Hung et al. | 361/119 |
| 5,155,650 | A | 10/1992 | Pitsch et al. | |
| 5,157,580 | A | 10/1992 | Hegner et al. | |
| 5,163,855 | A | 11/1992 | Gerke et al. | |
| 5,172,295 | A | 12/1992 | Hegner et al. | |
| 5,187,634 | A | 2/1993 | Pitsch et al. | |
| 5,248,953 | A | 9/1993 | Hönl | |
| 5,299,088 | A | 3/1994 | Hönl et al. | |
| 5,341,269 | A | 8/1994 | Hayward et al. | |
| 5,357,568 | A | 10/1994 | Pelegris | |
| 5,369,543 | A | 11/1994 | Bonnesen et al. | |
| 5,371,648 | A | 12/1994 | Bonvallat | |
| D354,940 | S | 1/1995 | Speiser et al. | |
| 5,398,152 | A | 3/1995 | Borkowicz et al. | |
| 5,410,443 | A * | 4/1995 | Pelegris | 361/119 |
| 5,494,461 | A | 2/1996 | Bippus et al. | |
| 5,546,267 | A | 8/1996 | Frederiksen et al. | |
| 5,555,153 | A | 9/1996 | Frederiksen et al. | |
| 5,574,614 | A | 11/1996 | Busse et al. | |
| 5,574,615 | A | 11/1996 | Busse et al. | |
| 5,596,475 | A | 1/1997 | Figueiredo et al. | |
| 5,627,721 | A | 5/1997 | Figueiredo et al. | |
| 5,808,849 | A | 9/1998 | Storbeck | |
| D402,628 | S | 12/1998 | Canuto et al. | |
| 5,883,953 | A | 3/1999 | Pelegris | |
| 5,910,877 | A | 6/1999 | Paske et al. | |
| 5,923,238 | A | 7/1999 | Polzehl et al. | |
| 5,936,821 | A | 8/1999 | Busse et al. | |
| 5,999,412 | A | 12/1999 | Busse et al. | |
| D429,690 | S | 8/2000 | Fristedt | |
| 6,266,223 | B1 | 7/2001 | Curry | |
| 6,302,723 | B1 | 10/2001 | Baum et al. | |
| 6,341,973 | B1 | 1/2002 | Endo | |
| 6,445,560 | B1 | 9/2002 | Bobert et al. | |
| D472,877 | S | 4/2003 | Jaag | |
| 6,654,223 | B1 | 11/2003 | Bippus et al. | |
| 7,008,243 | B2 | 3/2006 | Mueller et al. | |
| D523,819 | S | 6/2006 | Christianson et al. | |
| 7,147,412 | B2 | 12/2006 | Davis | |
| D535,618 | S | 1/2007 | Hu et al. | |
| 7,175,468 | B1 * | 2/2007 | Chang | 439/418 |
| D591,691 | S | 5/2009 | Baker et al. | |
| 2004/0246644 | A1 | 12/2004 | Sato et al. | |
| 2005/0094466 | A1 * | 5/2005 | Archer et al. | 365/222 |
| 2008/0032566 | A1 | 2/2008 | Walter et al. | |
| 2009/0296303 | A1 | 12/2009 | Petersen | |

FOREIGN PATENT DOCUMENTS

| | | | |
|---|---|---|---|
| DE | 37 28 368 | C1 | 11/1988 |
| DE | 100 01 553 | A1 | 8/2001 |

OTHER PUBLICATIONS

International Search Report and Written Opinion mailed Jul. 10, 2008.

* cited by examiner

FIG. 8
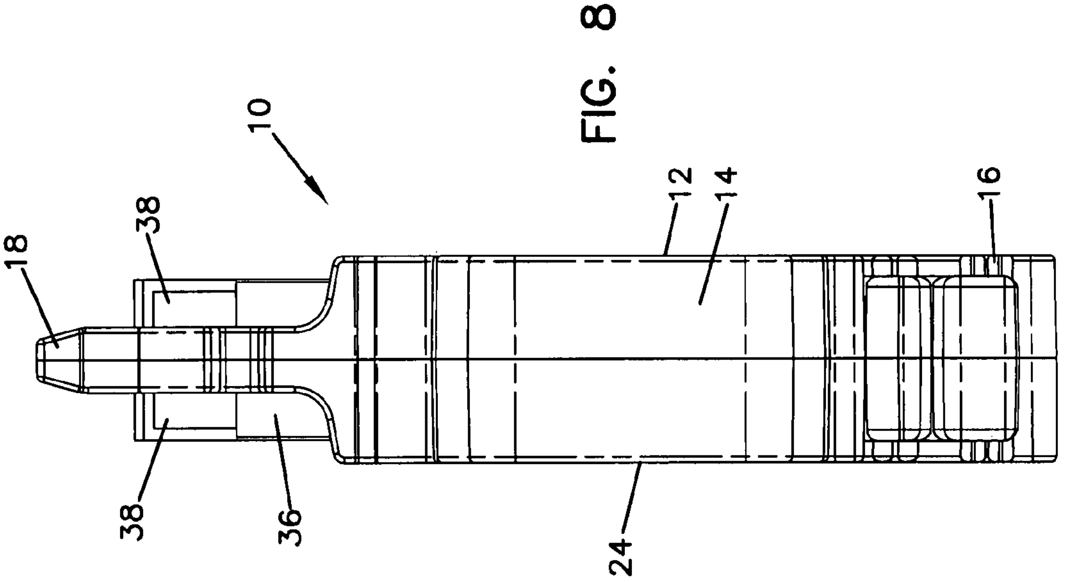
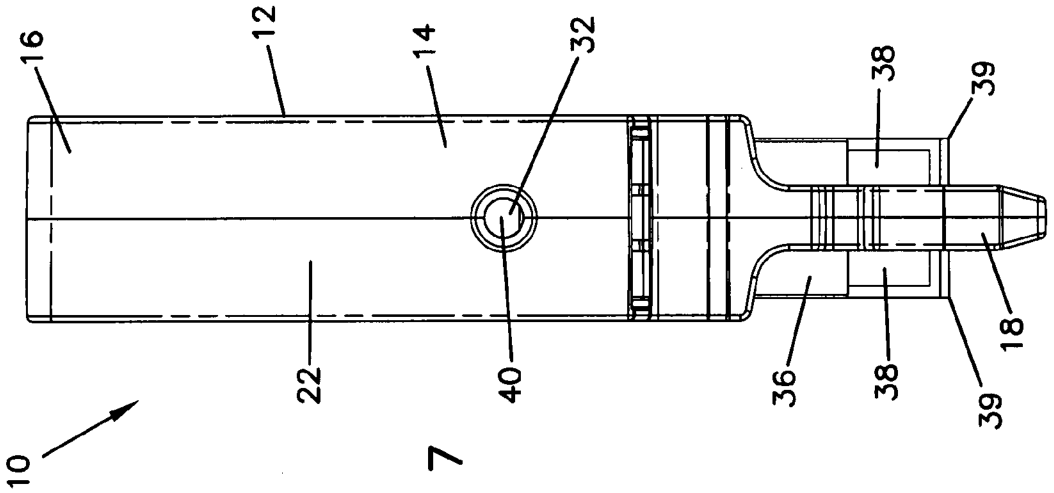
FIG. 7

OVERVOLTAGE PROTECTION PLUG

TECHNICAL FIELD

The present disclosure relates generally to circuit protection in communications system; more particularly, the present disclosure relates to an overvoltage protection plug usable in conjunction with a connection block.

BACKGROUND

Telecommunications systems generally include connection and disconnection systems, through which various types of telecommunications equipment are interconnected. Such systems generally require electrical protection, such as to prevent overvoltage and overcurrent events from damaging equipment, as can occur in the case of lightning strikes, power surges, or other electrical events. Various types of gas tube and solid state overvoltage protection components exist and are used in these telecommunications systems.

One piece of equipment used for connection of telecommunications systems is referred to herein as a connection block, sometimes referred to as a "Krone-style connector block", such as those manufactured by ADC GmbH, formerly Krone GmbH. Such systems include a high density array of electrical connectors in a punch-down configuration, and are designed to accept overvoltage and overcurrent protection devices to protect the telecommunications equipment connected to the output side of the telecommunications circuit connected via the block. Because of the large number of wires being connected in a small area in a connection block, a small form factor circuit protection element is dictated. Other design requirements and failsafe protections may also limit the applicability of various gas tube and solid state protection devices. For example, gas tube overvoltage protection systems are disadvantaged in that, for higher voltage applications, the gas tube required increases in size. Additionally, cost reduction considerations require minimization of the number of components used.

SUMMARY

The present disclosure relates generally to an overvoltage protection plug used in conjunction with a connection block. The overvoltage protection plug utilizes a gas tube rated sufficiently to meet various voltage safety certification requirements, and is configured to fit into a connection block while avoiding physical interference with neighboring circuit protection elements or connection locations.

According to a first aspect, an overvoltage protection plug is disclosed. The plug includes a housing forming a body, a handle, and an insertion portion. The handle of the housing extends rearward from a top edge of the housing. The plug further includes a circuit board mounted at least partially within the body. A portion of the circuit board protrudes from the housing at the insertion portion and includes metallic connection pads configured for interconnection to a connection block. The plug also includes a gas tube mounted to the circuit board and residing within the housing, the gas tube electrically connected to the metallic connection pads by a plurality of circuit traces on the circuit board.

According to a second aspect, an overvoltage protection plug is disclosed. The overvoltage protection plug includes a housing forming a body, a handle, and an insertion portion. The plug further includes a circuit board mounted at least partially within the body, a portion of the circuit board protruding from the housing at the insertion portion. The circuit board includes metallic connection pads configured for interconnection to a connection block. The plug also includes a gas tube mounted to the circuit board, the gas tube electrically connected to the metallic connection pads by a plurality of circuit traces on the circuit board. The body of the plug includes an interior cavity having generally parallel side walls, the side walls including a thinned region surrounding the gas tube.

According to a third aspect, a connection block assembly is disclosed. The connection block assembly includes a connection block, a ground bar, and an overvoltage protection plug. The connection block includes a plurality of circuit connection locations. The ground bar is attached to the connection block and includes a plurality of grounding extensions corresponding to the plurality of circuit locations. The overvoltage protection plug is inserted at one of the plurality of connection locations, and includes a housing, a circuit board, and a gas tube. The housing forms a body, a handle, and an insertion portion, the handle of the housing extending rearward from a top edge of the housing. The circuit board is mounted at least partially within the body, with a portion of the circuit board protruding from the housing at the insertion portion and including metallic connection pads configured for interconnection to a connection block. The gas tube is mounted to the circuit board and resides within the housing, the gas tube electrically connected to the metallic connection pads by a plurality of circuit traces on the circuit board.

BRIEF DESCRIPTION OF THE DRAWINGS

FIG. 7 is a top view of the overvoltage protection plug of FIG. 1;

FIG. 8 is a bottom view of the overvoltage protection plug of FIG. 1;

DETAILED DESCRIPTION

Figures 1, 2:
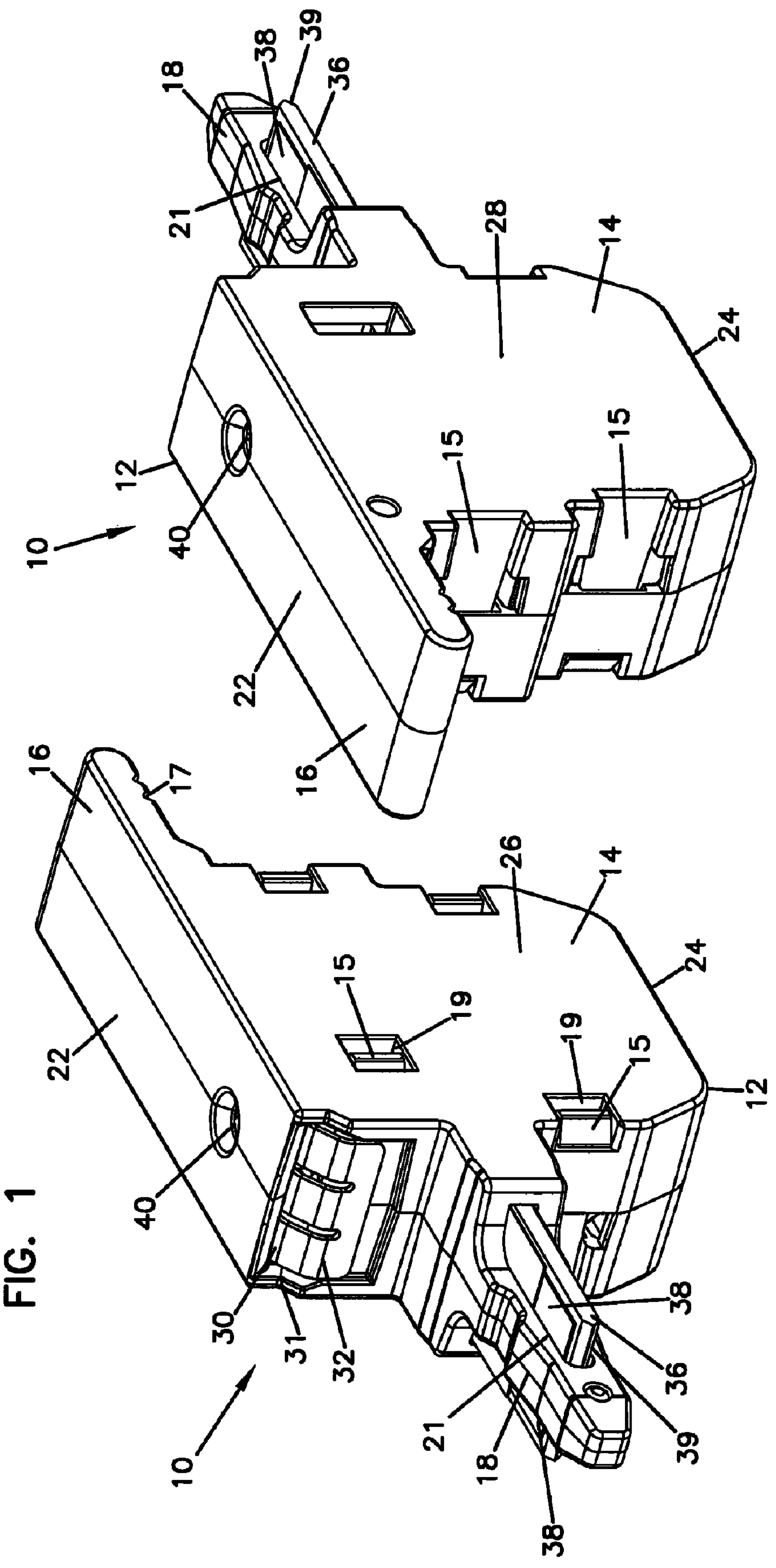
FIG. 1 is a front perspective view of a overvoltage protection plug according to the present disclosure.
FIG. 2 is a rear perspective view of the overvoltage protection plug of FIG. 1.
Figure 6:
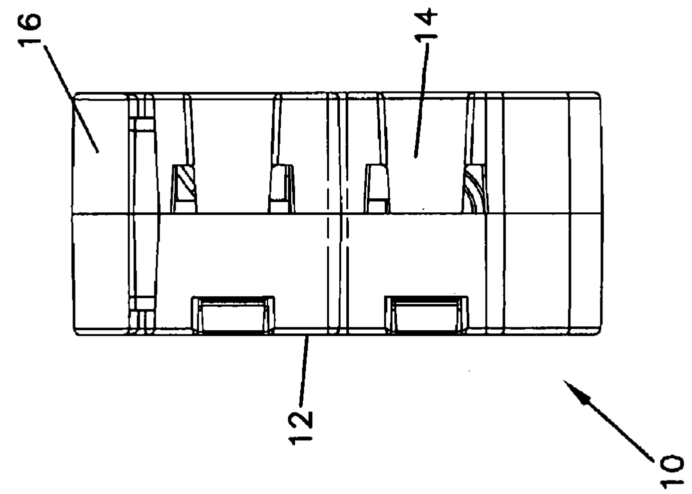
FIG. 6 is a rear elevation view of the overvoltage protection plug of FIG. 1.
Figure 3:
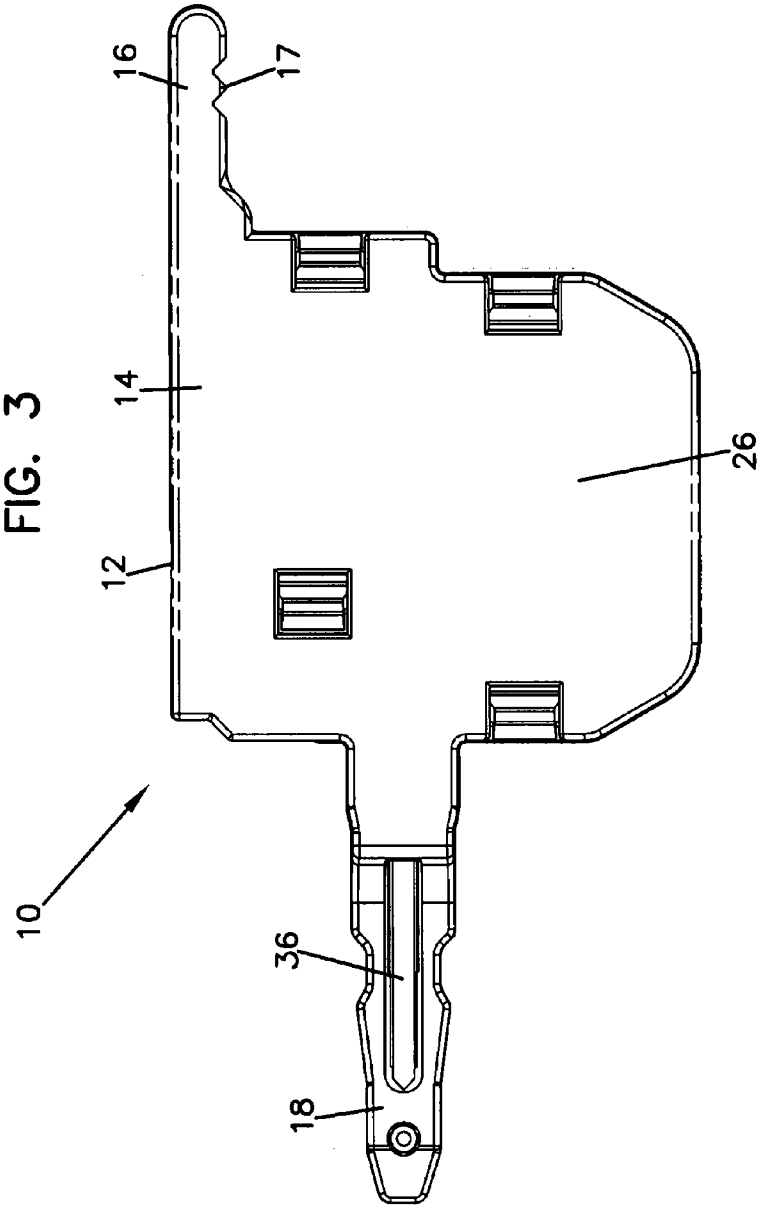
FIG. 3 is a right side elevation view of the overvoltage protection plug of FIG. 1.
Figure 5:
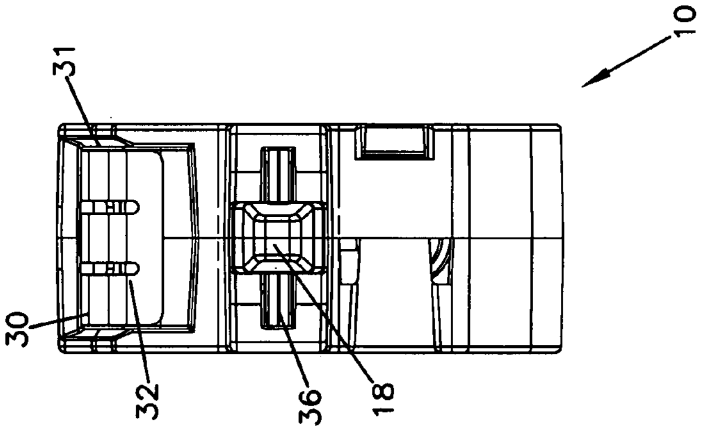
FIG. 5 is a front elevation view of the circuit protection plug of FIG. 1.
Figure 4:
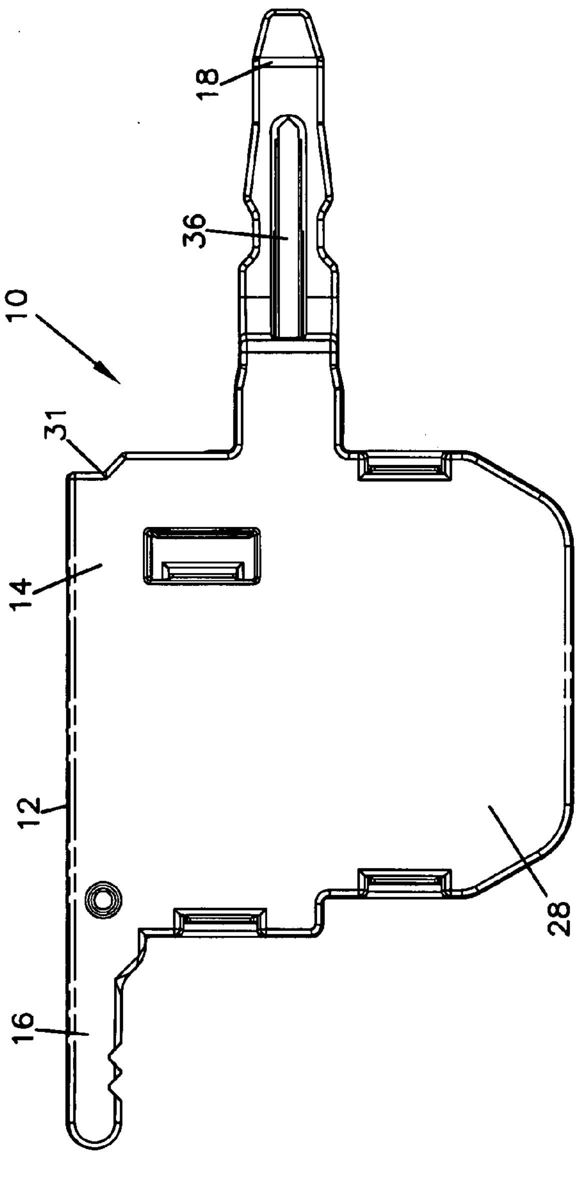
FIG. 4 is a left side elevation view of the overvoltage protection plug of FIG. 1.

Referring to FIGS. 1-8, an overvoltage protection plug 10 is disclosed. The plug 10 provides overvoltage protection for telecommunications circuits, such as due to lightning strikes, power surges, or other unexpected events occurring within the telecommunications circuits. The plug 10 is configured for insertion into a connection block, such as a Krone-style connection block widely used in telecommunication interconnection systems, which include an array of connection locations and can be arranged in a number of adjacent rows. Example Krone-style blocks are shown in FIGS. 13-16, below.

The plug 10 includes a housing 12, which forms a body portion 14, a handle 16, and an insertion portion 18. The housing 12 can be made from a heat-resilient material, such as a hardened plastic. The housing 12 can be constructed as a unitary element, or can be made from two or more coordinating portions fitted together to form the housing around the electrical components described below. In the embodiment shown, two portions or pieces 13 of the housing 12 snap fit together around internal circuitry.

Figure 9:
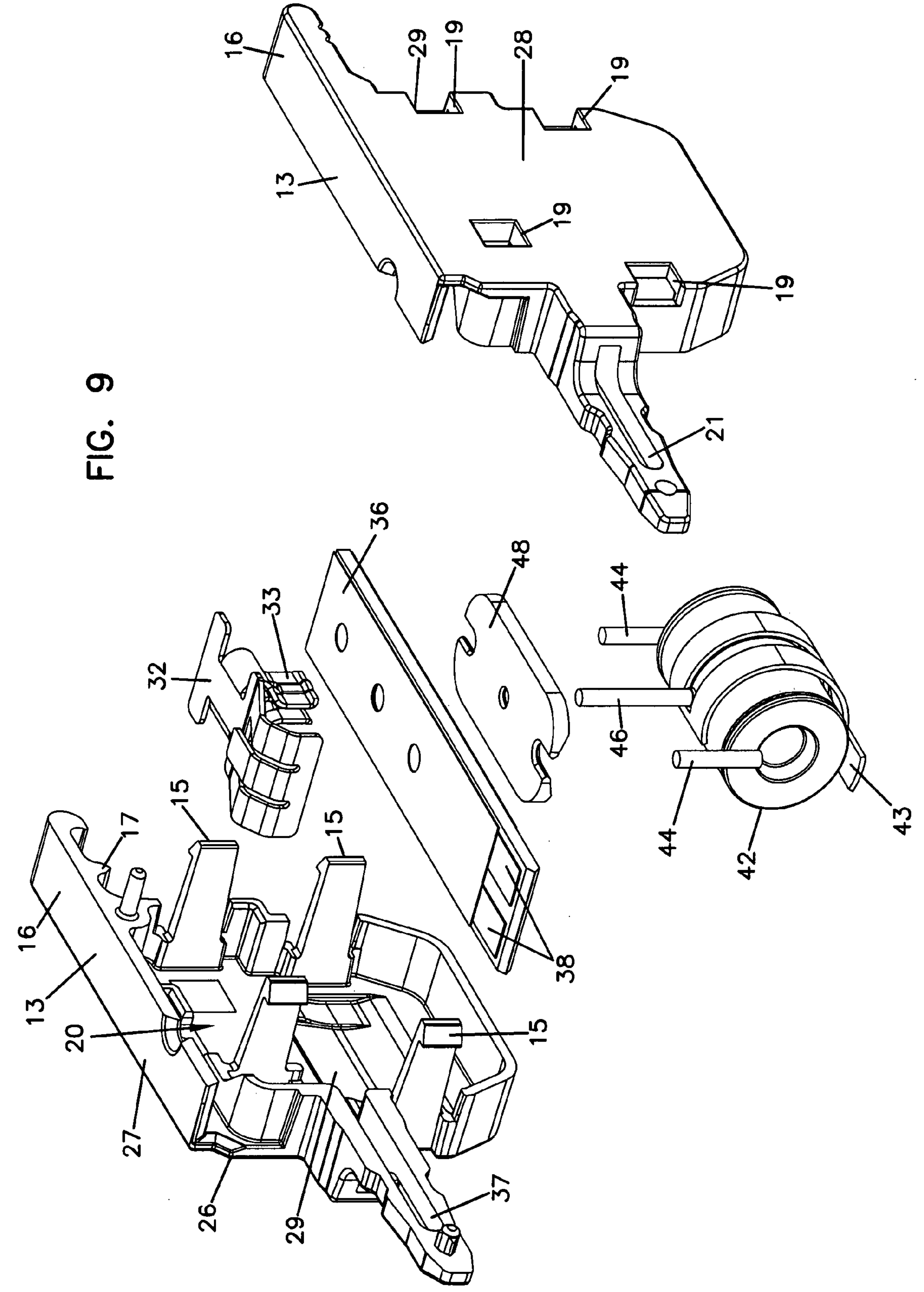
FIG. 9 is an exploded perspective view of the overvoltage protection plug of FIG. 1.
Figure 12:
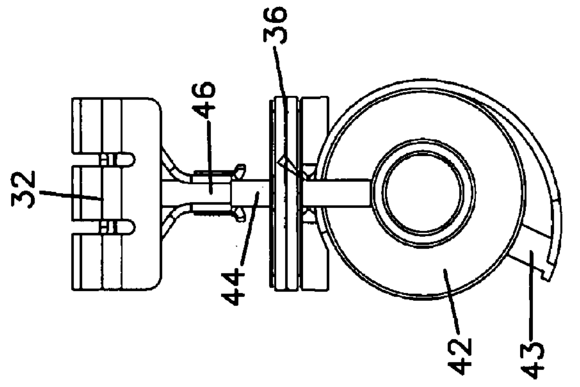
FIG. 12 is a front elevation view of internal circuitry of the overvoltage protection plug of FIG. 1.
Figure 10:
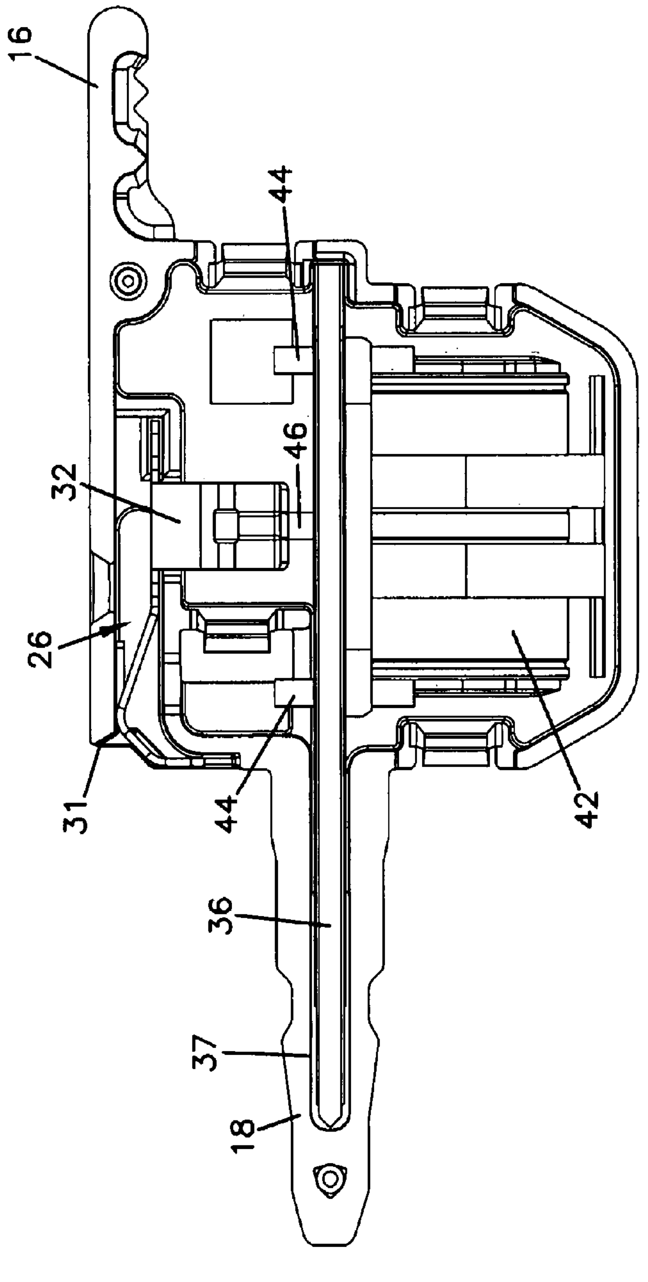
FIG. 10 is a right side view with portions of the housing removed, showing internal components of the overvoltage protection plug of FIG. 1.
Figure 11:
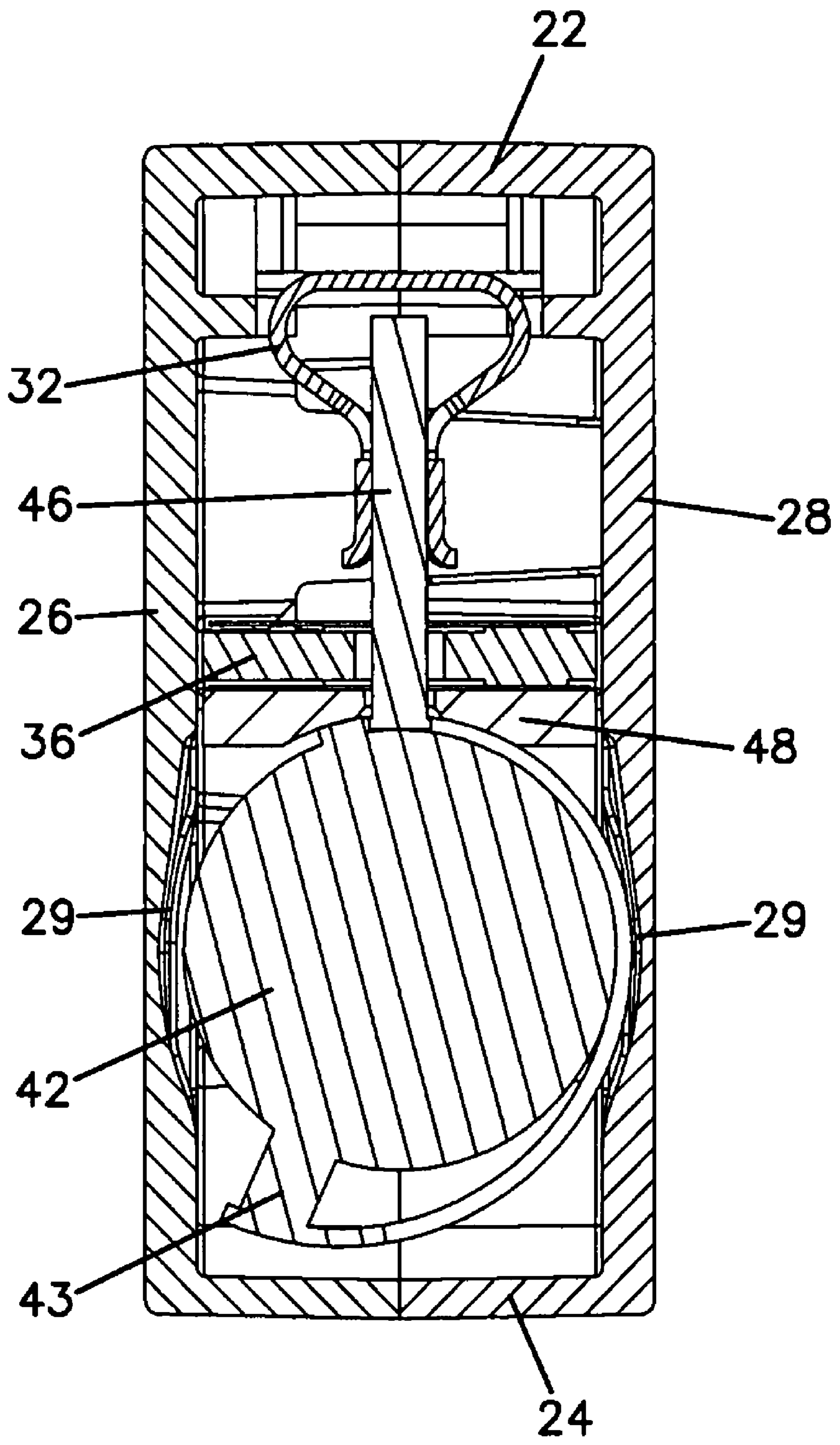
FIG. 11 is a widthwise cross-sectional view bisecting the body of the overvoltage protection plug of FIG. 1.
Figure 13:
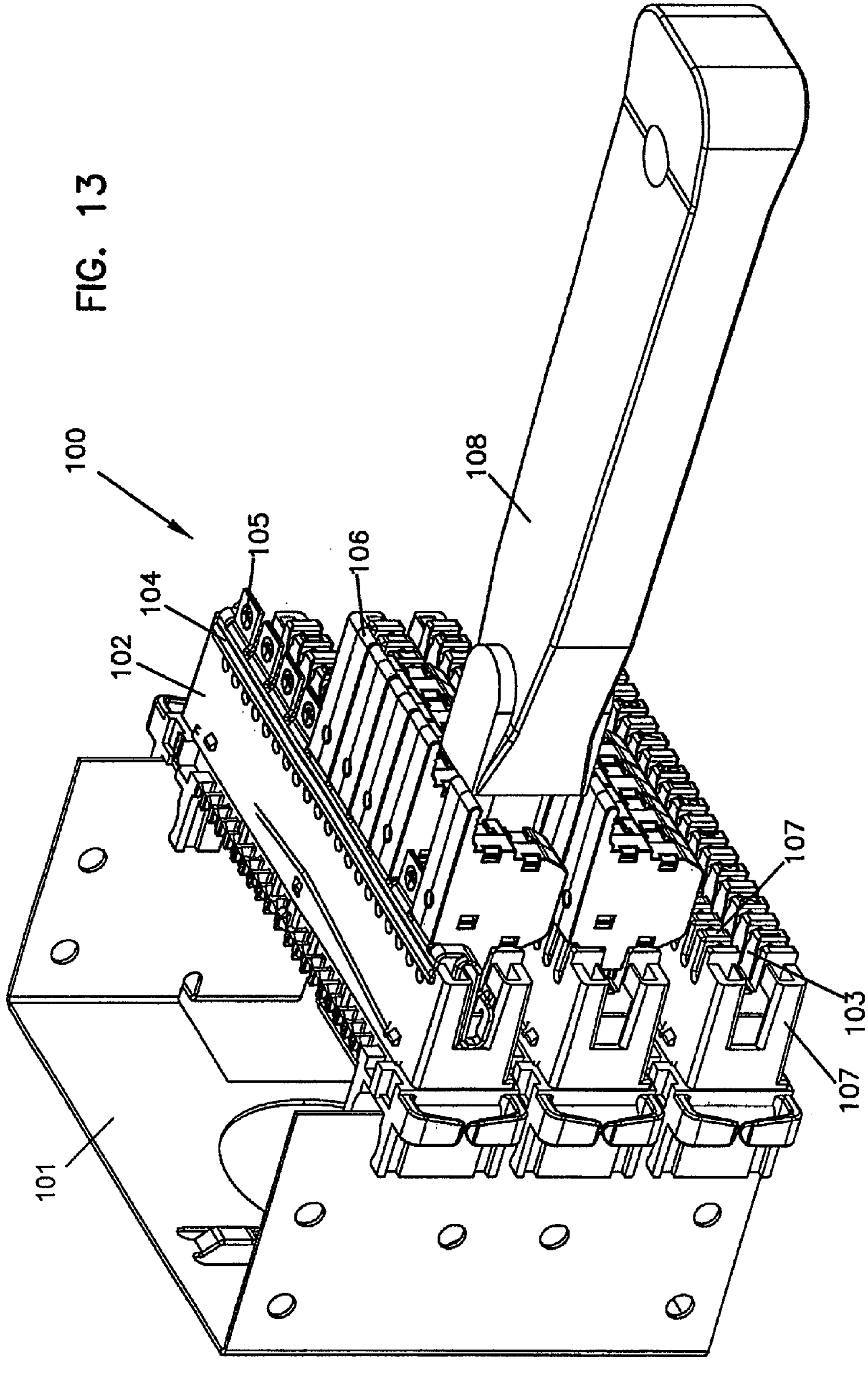
FIG. 13 is a perspective view of a connection block assembly including a plurality of overvoltage protection plugs populating various positions in the block.
Figure 14:
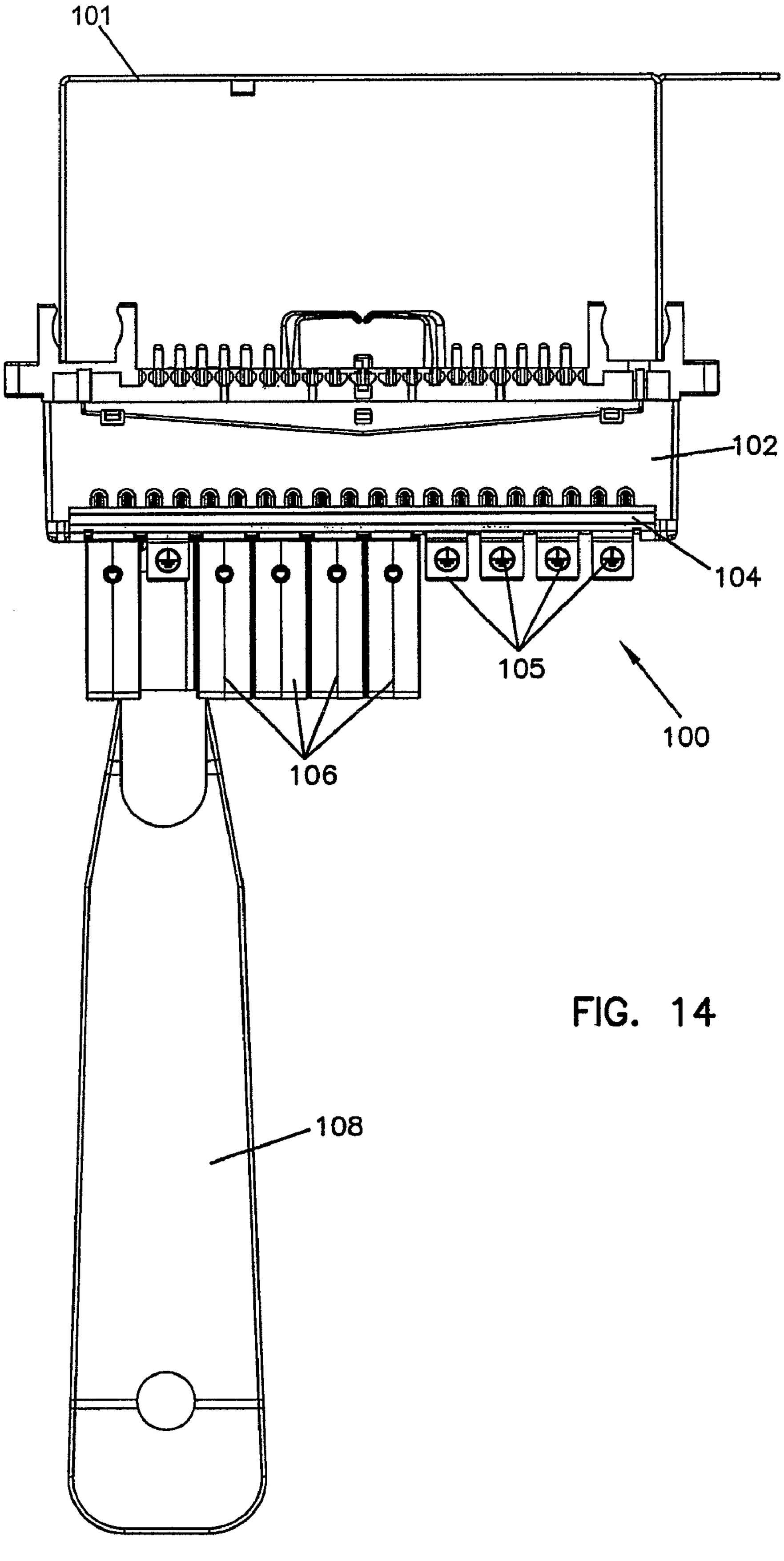
FIG. 14 is a top view of the connection block assembly of FIG. 13.
Figure 15:
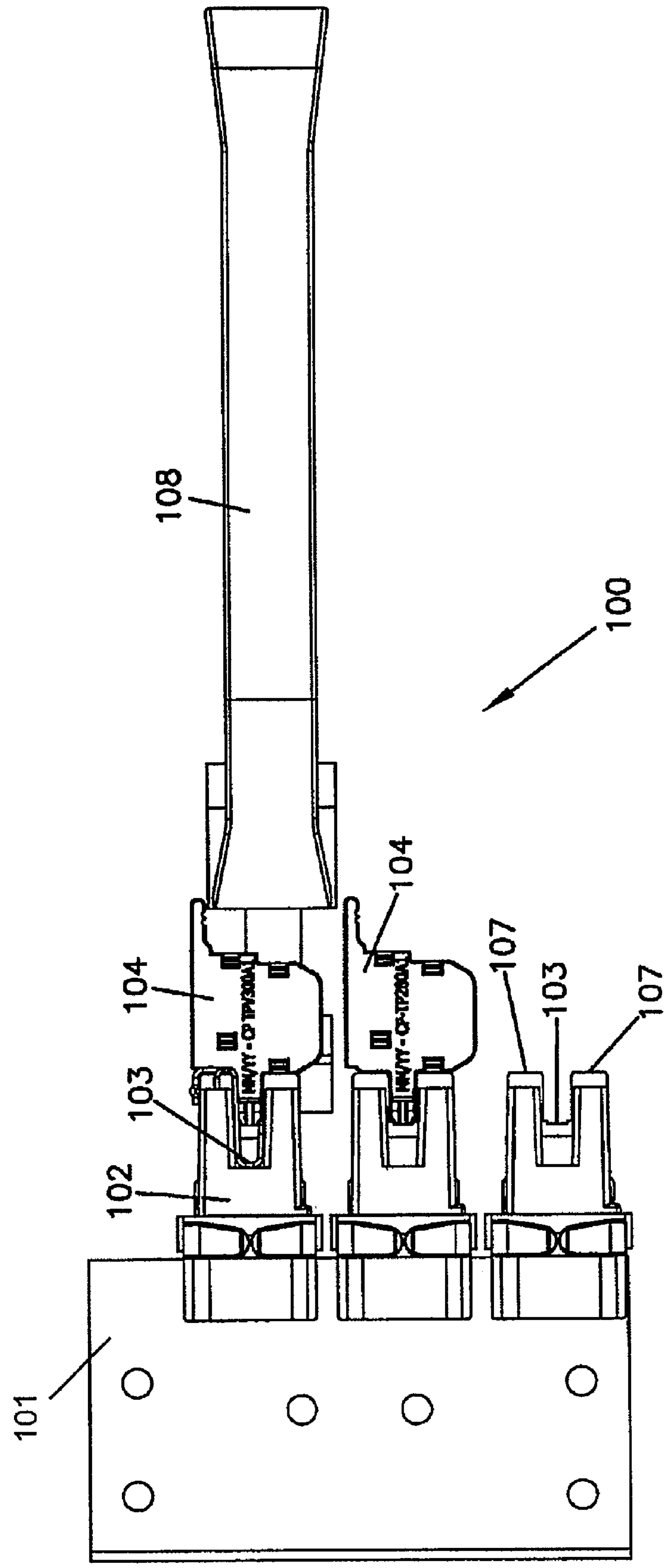
FIG. 15 is a side view of the connection block assembly of FIG. 13.
Figure 16:
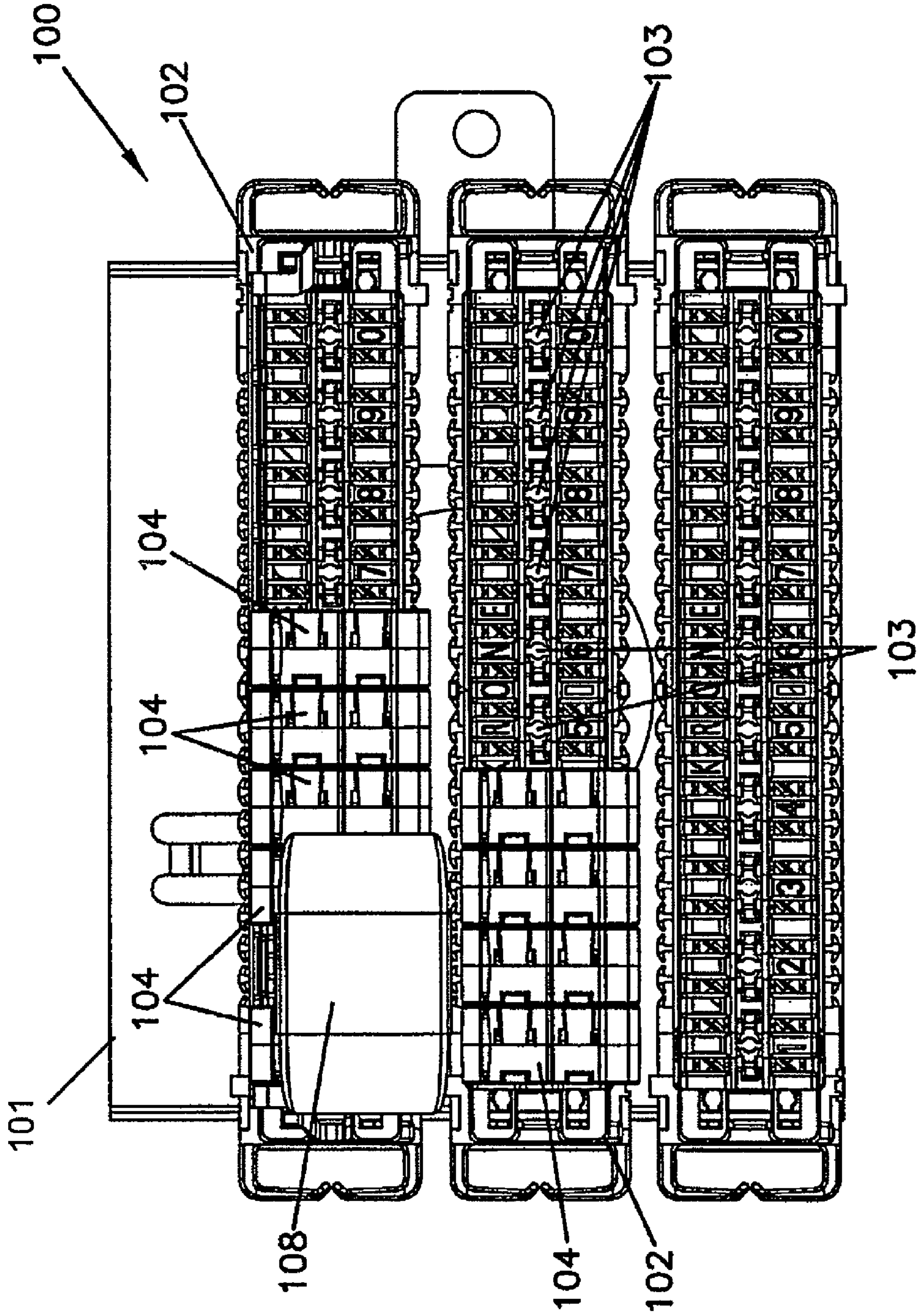
FIG. 16 is a front plan view of the connection block assembly of FIG. 13.
Figure 17:
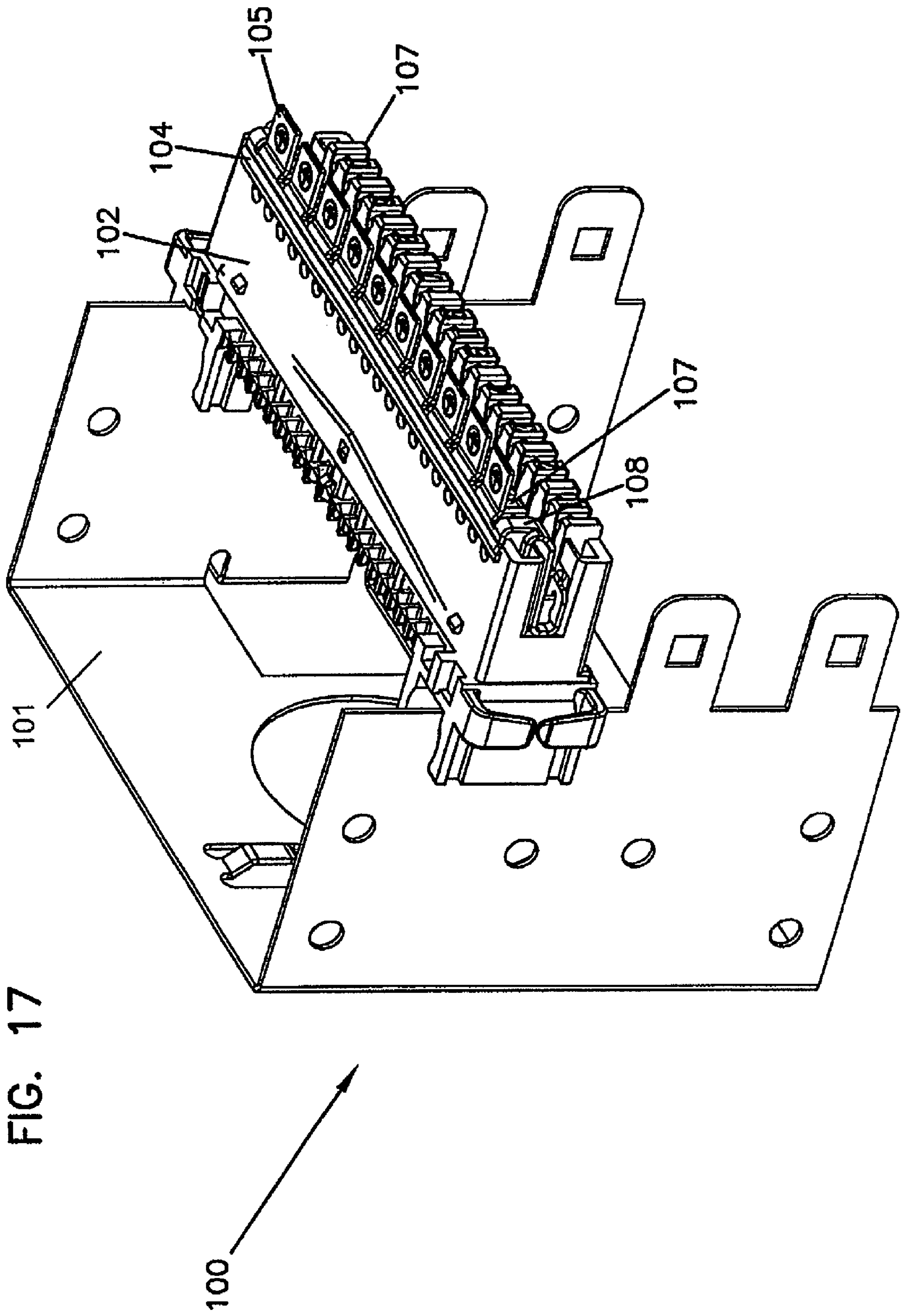
FIG. 17 is a perspective view of the connection block assembly of FIG. 13 with overvoltage protection plugs removed.
Figure 20:
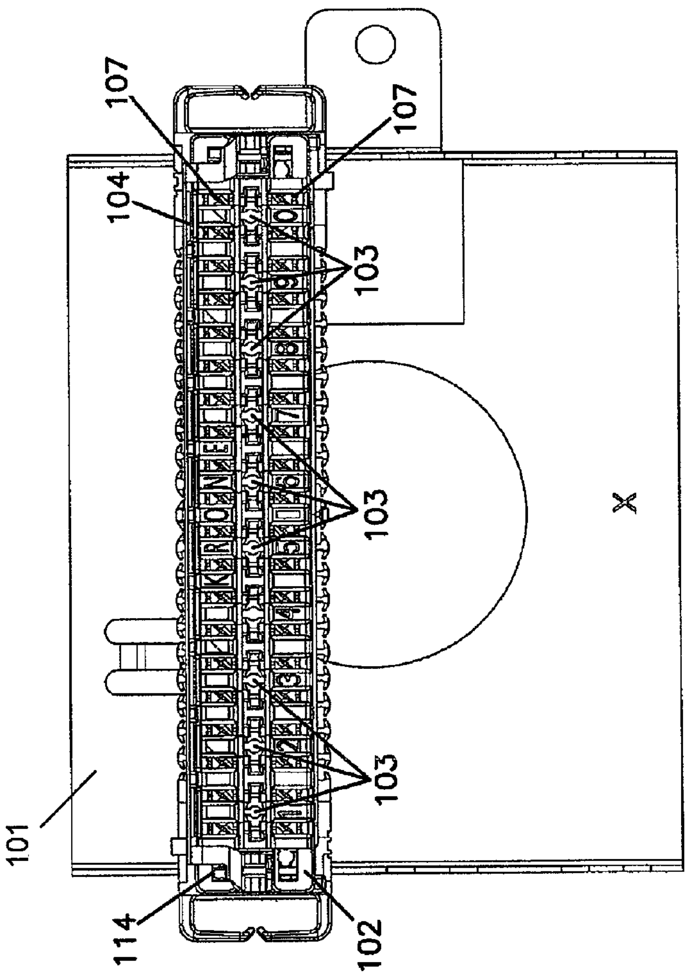
FIG. 20 is a front plan view of the connection block assembly of FIG. 13 with overvoltage protection plugs removed.
Figure 18:
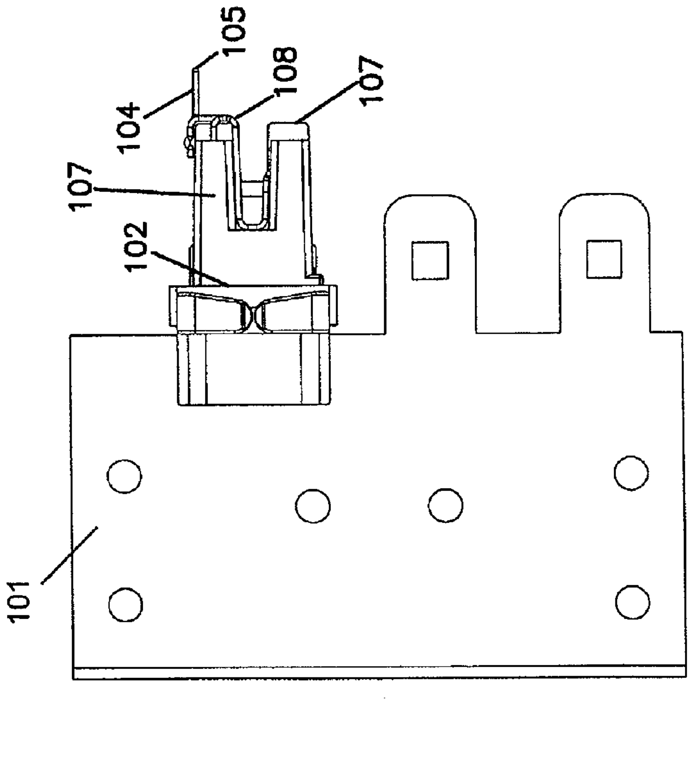
FIG. 18 is a side elevation view of the connection block assembly of FIG. 13 with overvoltage protection plugs removed.
Figure 19:
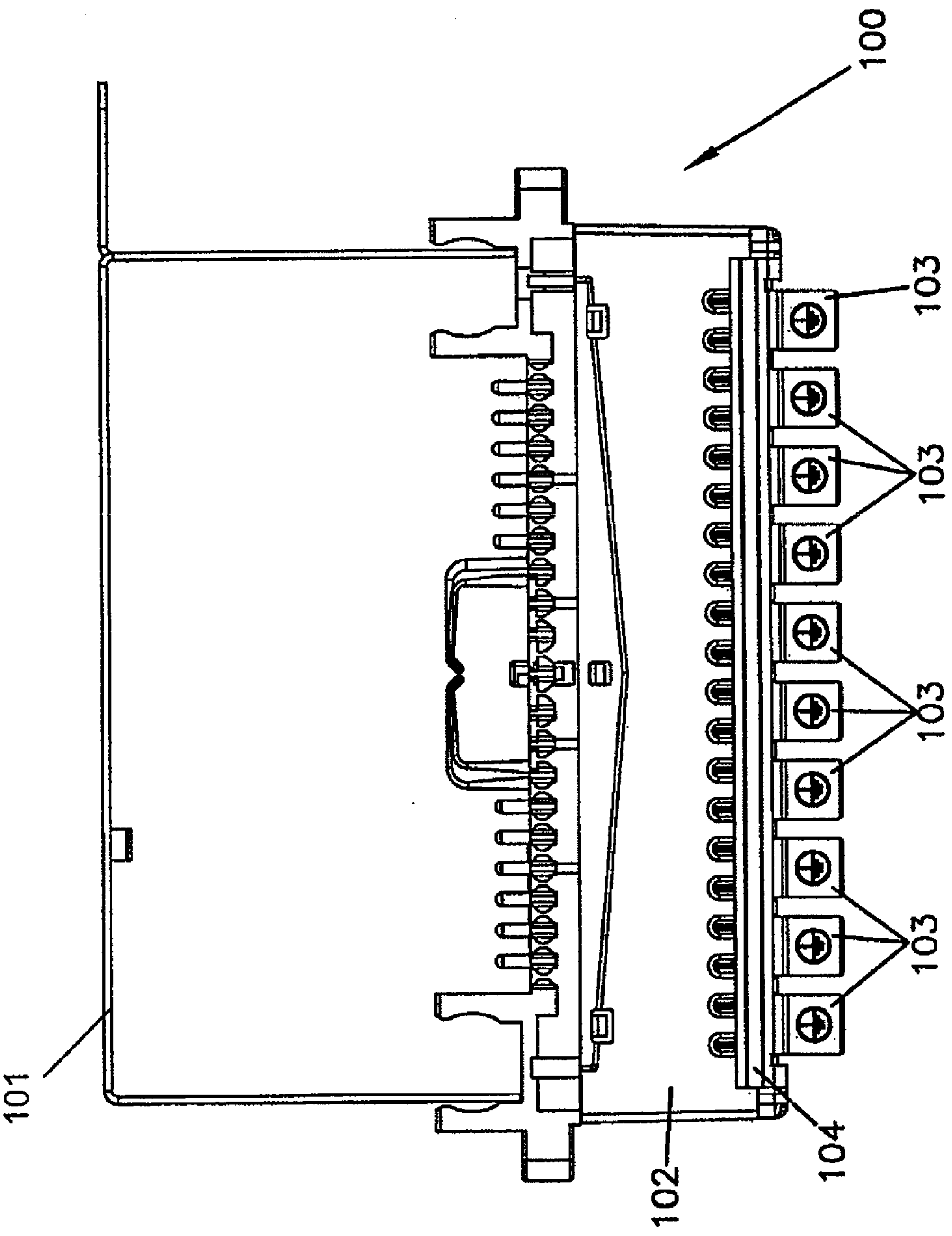
FIG. 19 is a top plan view of the connection block assembly of FIG. 13 with overvoltage protection plugs removed.
Figure 21:
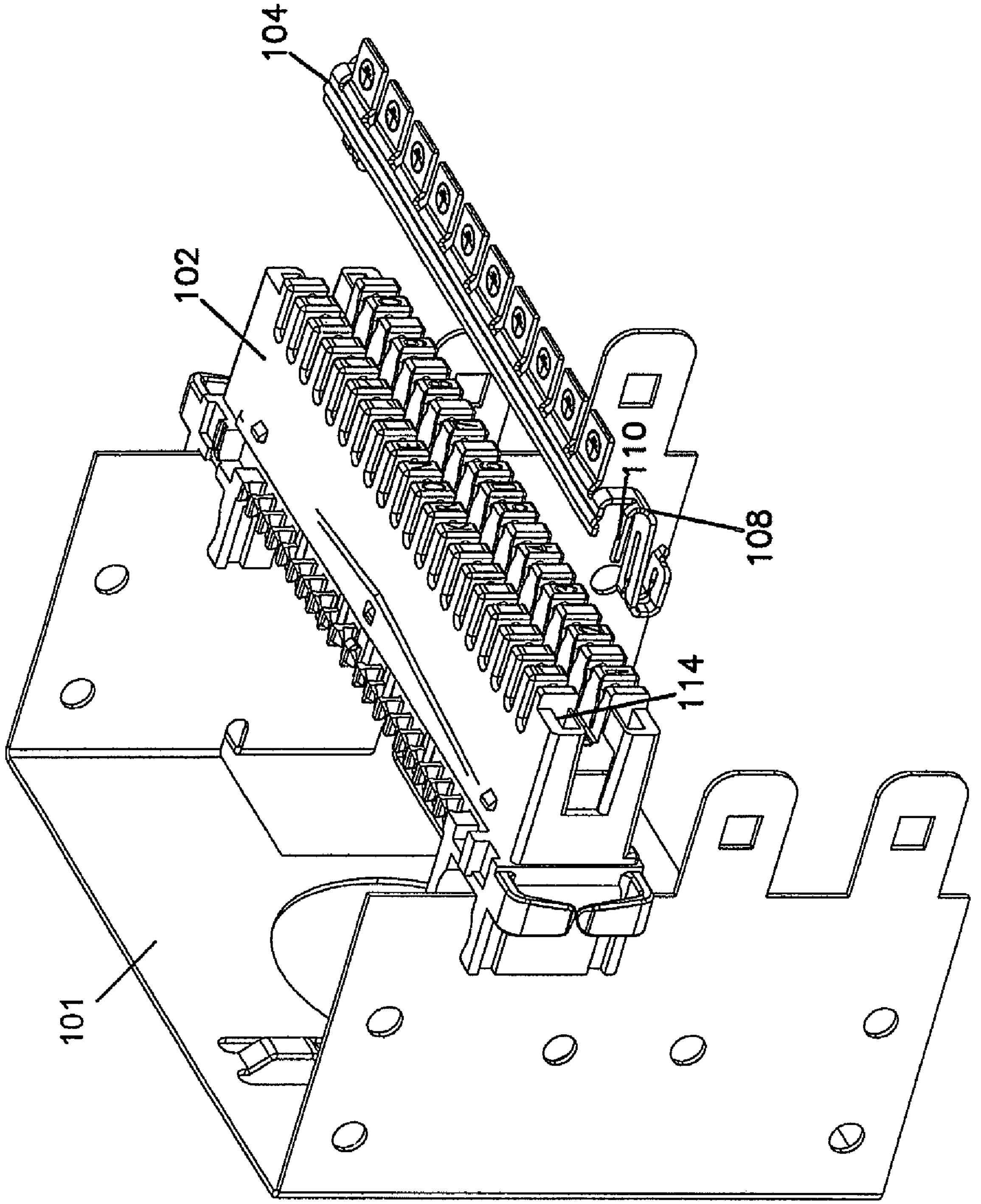
FIG. 21 is an exploded perspective view of the connection block assembly of FIG. 13 with overvoltage protection plugs removed.
Figure 22:
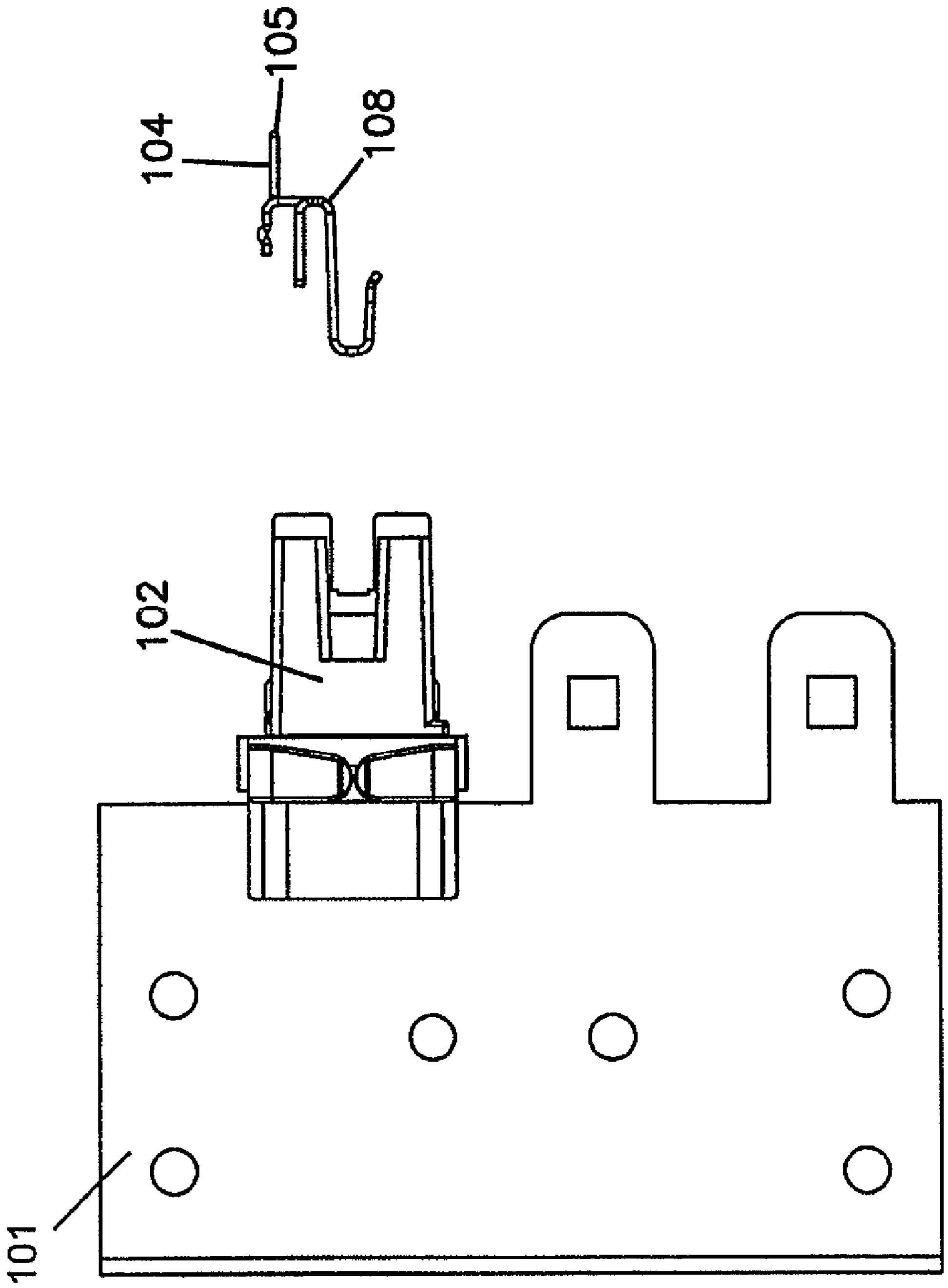
FIG. 22 is an exploded side elevation view of the connection block assembly of FIG. 13 with overvoltage protection plugs removed.
Figure 23:
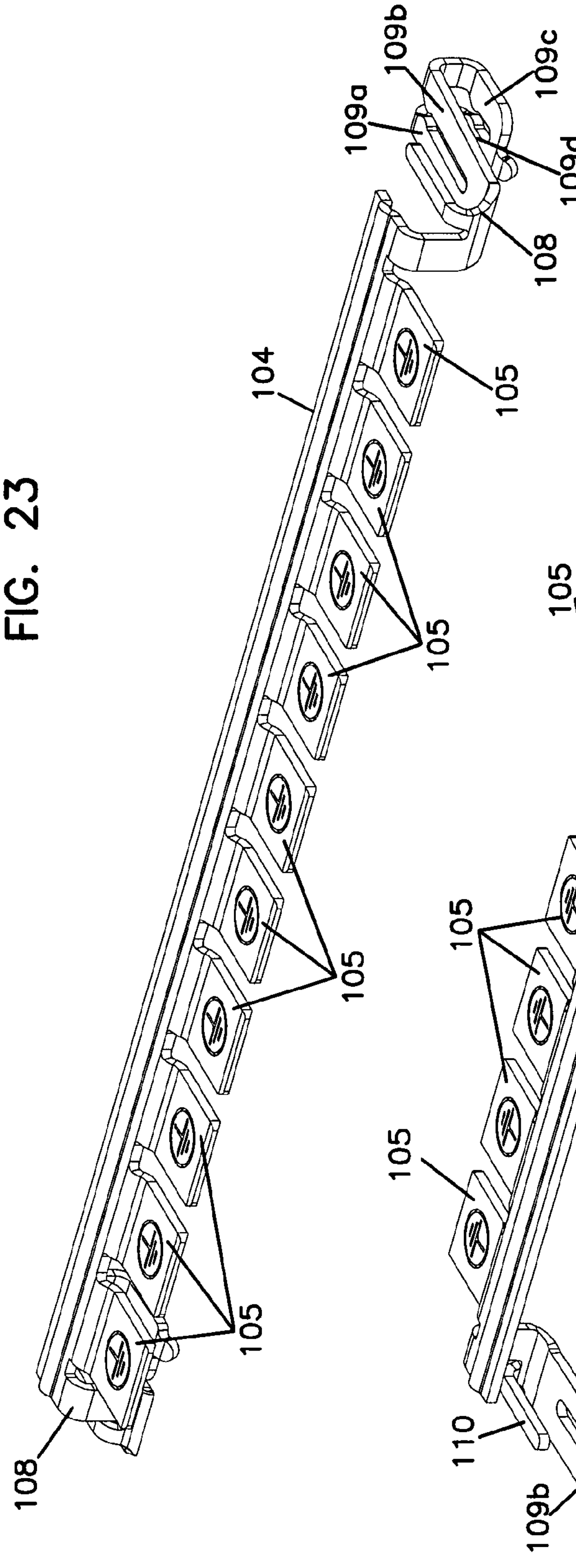
FIG. 23 is a perspective view of a ground bar useable in the connection block assembly of FIG. 13.
Figure 24:
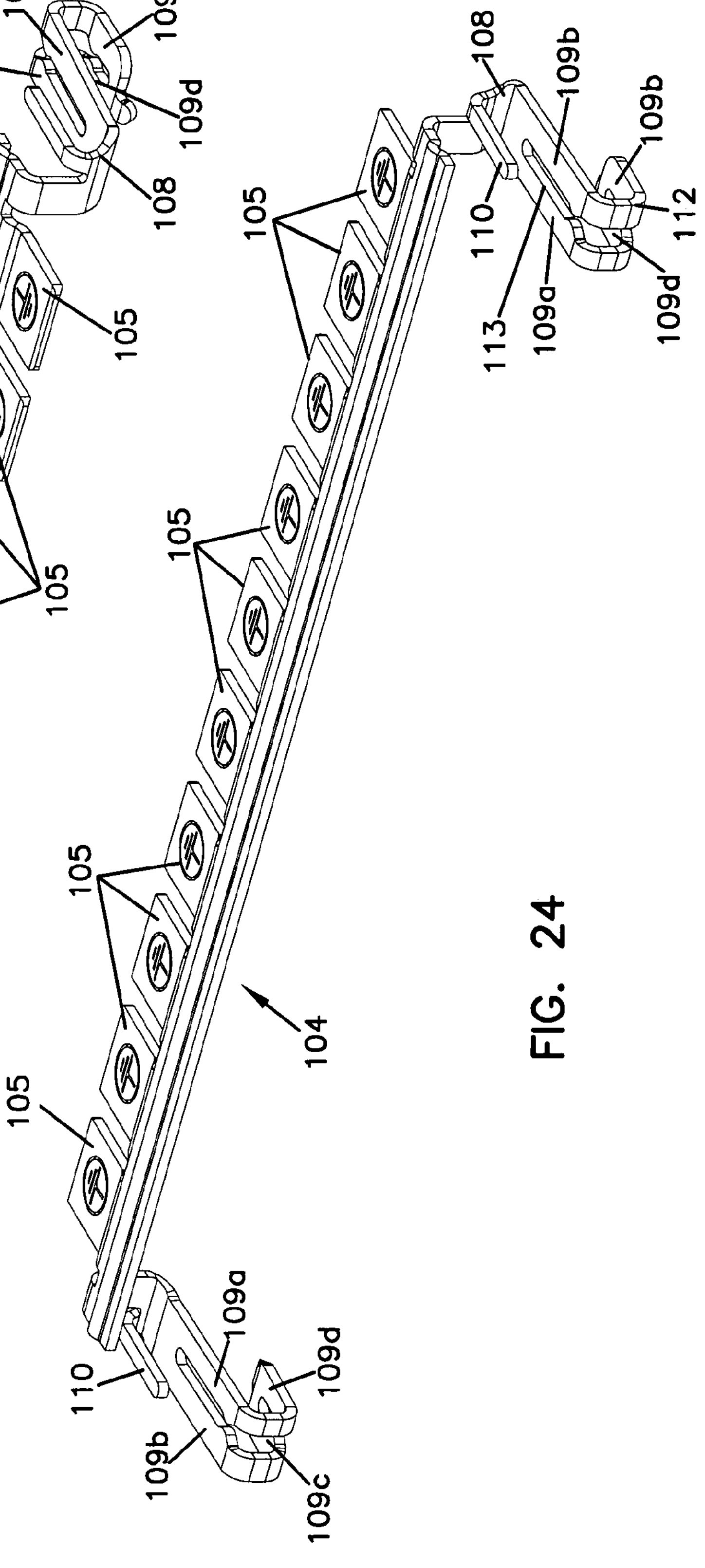
FIG. 24 is an alternate perspective view of the ground bar of FIG. 23.
Figure 25:
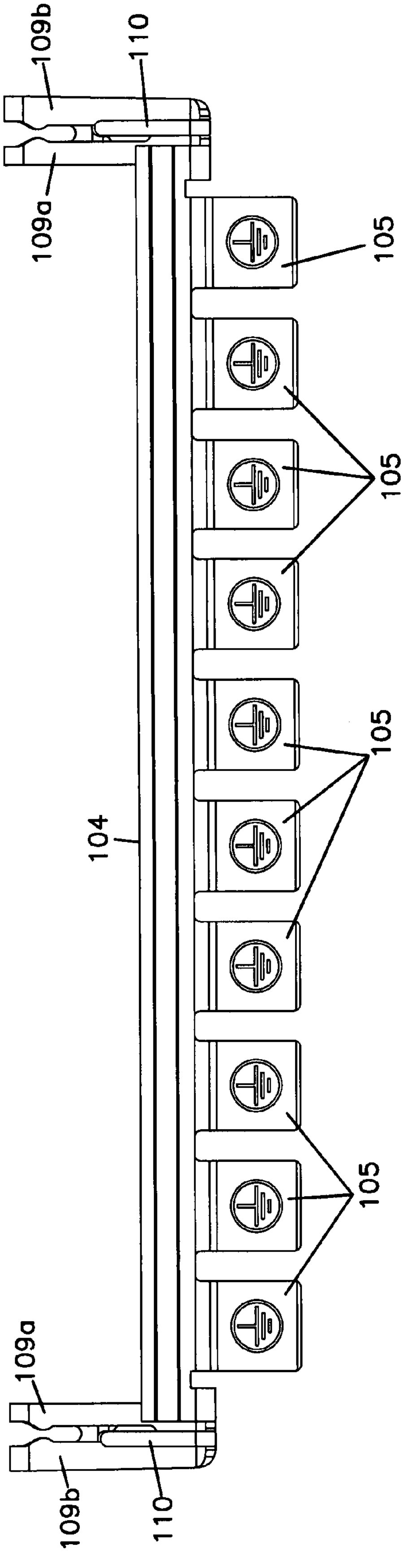
FIG. 25 is a top view of the ground bar of FIG. 23.
Figure 26:
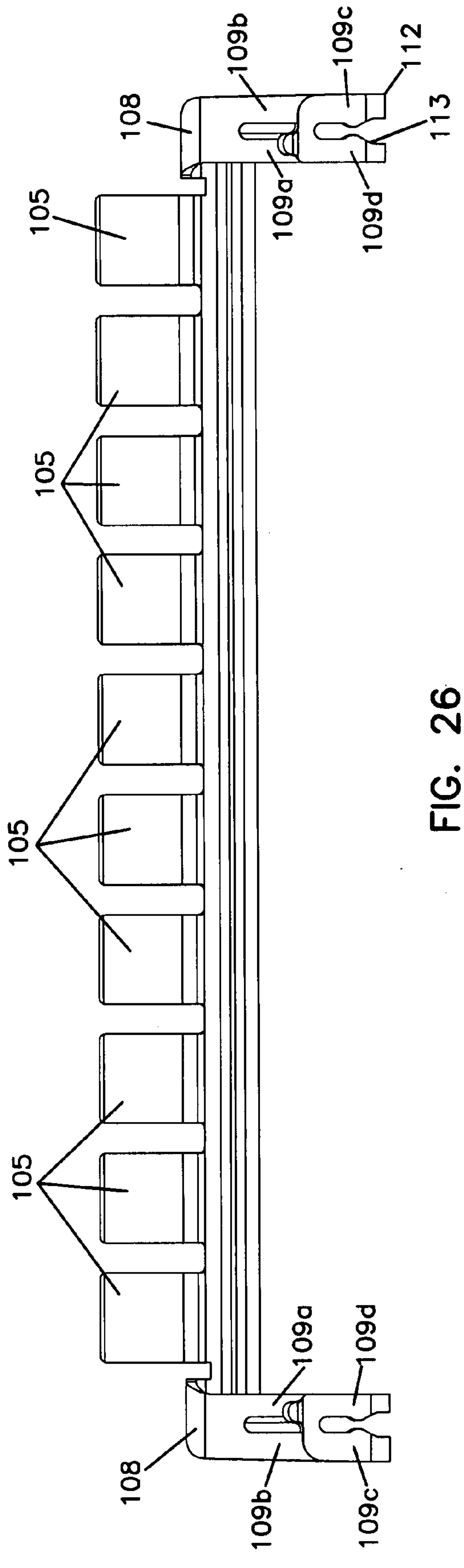
FIG. 26 is a bottom view of the ground bar of FIG. 23.
Figure 27:
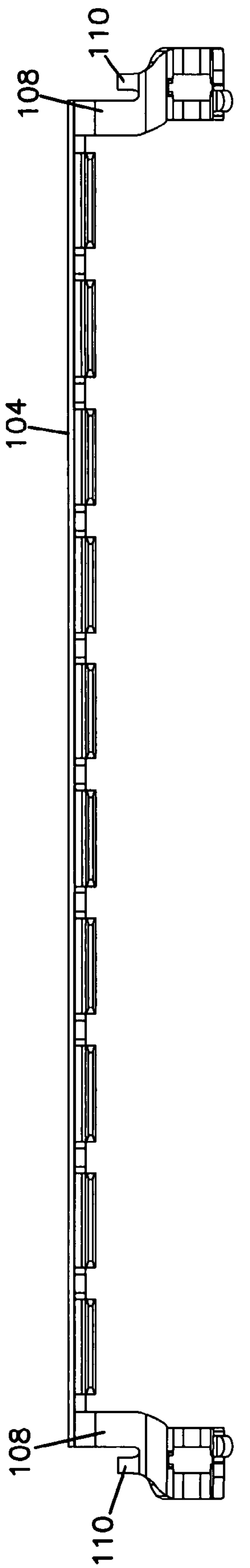
FIG. 27 is a front view of the ground bar of FIG. 23.
Figure 28:
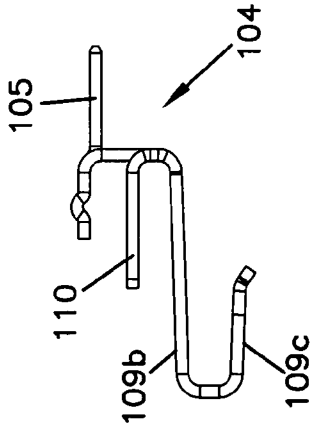
FIG. 28 is a side view of the ground bar of FIG. 23.

The body portion 14 forms an interior cavity 20, shown in FIGS. 9-11, configured to hold circuitry internal to the plug 10. The body portion 14 is generally rectangular, and includes a top wall 22 and a bottom wall 24, as well as side walls 26, 28. The top and bottom walls 22, 24 are generally parallel, and the distance between the top and bottom walls 22, 24 is limited by the distance between adjacent rows of connection locations in a connection block. The side walls 26, 28 are also generally parallel, and the distance between the side walls 26, 28 is likewise limited by the distance between the connection locations in a connection block. In one embodiment, the distance between the top and bottom walls 22, 24 is approximately 13/16 of an inch, and the distance between the side walls 26, 28 is approximately 5/16 of an inch. In various other embodiments, the distances may be larger or smaller based on the need to fit electrical components within the housing 12 and limited by the distance between the various connections in a connection block. Housing 12 is formed by portions 13 snap fit together with projecting snaps 15, and sockets 19, in the illustrated embodiment.

The body portion 14 also includes an opening 30 exposing a ground clip 32. The opening 30 has a plurality of beveled edges 31 configured to assist in inserting the plug 10 into a connection block having a ground bar such that the ground clip 32 and ground bar contact, grounding the electrical components internal to the plug 10. An example of this configuration is shown in FIGS. 13-16, below. The housing 12 also optionally includes a viewing aperture 40 which can be used to confirm that the plug 10 has been properly inserted onto the ground bar. The metallic ground clip 32 will be visible through the aperture 40 when the plug 10 is not fully inserted onto the connection block. The ground bar will be visible when the plug 10 is fully inserted.

The handle 16 extends rearward from the body portion 14 of the plug 10, and provides a location that can be gripped by a user of the plug 10 to insert and remove the plug from a connection block. The handle 16 optionally includes ridges 17 extending to the sides of the handle and configured to assist a user in gripping the handle 16 to insert or remove the plug 10 from a connection block. The ridges 17 in the handle 16 are configured and located so as to allow a user to grip the plug 10 using a punch down tool, such as a gripping portion (for example, a hook) of a punch down tool distributed by ADC Krone GmbH. An example punch down tool is described in U.S. Pat. No. 4,434,542, the disclosure of which is hereby incorporated by reference in its entirety. Other gripping configurations can be included on the housing 12 as well, for use with other types of gripping tools.

In the embodiment shown, the handle 16 is integrally formed with the body portion 14, and extends rearward from the body portion 14 along the top wall 22. In this location, the handle 16 does not interfere with use of punch-down tools used to connect wires to adjacent connection locations in the connection block, as shown in FIGS. 13-16. However, other locations and configurations for the handle 16 are possible as well.

The insertion portion 18 is configured to fit into a connection location of a connection block. The insertion portion 18 is a narrow portion of the housing that extends from a generally central location of the front portion of the housing 12. The insertion portion 18 includes openings 21 exposing a circuit board 36 such that contacts 38 on the circuit board 36 electrically connect to telecommunications circuits when the plug 10 is inserted into a connection location of a connection block. In the embodiment shown, the insertion portion 18 is integrally formed with the body portion 14. Various other configurations and locations of the insertion portion 18 on the housing 12 are possible as well.

Referring now to FIGS. 9-12, various mechanical and electrical components of the overvoltage protection plug 10 are further described. The housing 12 is shown as a two-piece snap-fit construction, with first and second portions 27, 29 including the side walls 26, 28, respectively. The housing 12 is configured to surround the circuit board 36, such that the circuit board extends through a central portion of the housing 12 substantially from the insertion portion 18 to the rear of the body portion 14, near the handle 16. The circuit board 36 provides the electrical connection between electrical components internal to the housing 12 and the connection block via the contacts 38 on the exposed portions of the circuit board extending through the insertion portion 18 of the housing 12.

A gas tube 42 resides within the body portion 14 of the housing 12, and connects to the portion of the circuit board 36 internal to the body portion. The gas tube 42 is a three-pin gas tube that provides overvoltage protection based on the voltage difference detected between the circuit traces 38 when the plug 10 is inserted into a connection block. The gas tube 42 includes two signal pins 44 and a ground pin 46. The signal pins 44 connect to the circuit board 36, which includes traces (not shown) connecting the signal pins to the contacts 38. The ground pin 46 connects to a ground connection of the circuit board 36, and also connects to the ground clip 32 at connection 33. The ground clip 32 facilitates insertion of a grounding extension protruding upwardly from the ground bar, as illustrated in FIGS. 13-16. A spacer 48 separates the circuit board 36 from the gas tube 42, and protects the circuit board 36 from the heat generated by the gas tube 42.

Operation and use of the gas tube 42 and associated circuitry is as follows. When the plug 10 is inserted at a connection location of a connection block, the contacts 38 experience voltage differences based on signals connected to that connection location. So long as the voltage difference is less than a threshold voltage of the gas tube 42, the plug 10 allows the signals to continue through the telecommunications circuit connected to that connection location.

When the voltage exceeds a specific threshold voltage, such as 220 V or some other expected voltage limit of the telecommunications circuit, the gas in the gas tube 42 excites, creating a short circuit to the ground pin 46. The ground pin 46 is connected to the ground clip 32 and thereby to a grounding bar mounted on the connection block when the plug 10 is inserted into the block, as shown in FIGS. 13-16. Overvoltage events are thereby grounded, while the expected signal events flow uninterrupted through the connection block and plug 10.

During an overvoltage event, excited gas in the gas tube 42 generates heat. For a case in which a prolonged overvoltage event occurs, the gas tube 42 also optionally includes a melt element 43 that, upon continued exposure to heat due to the prolonged overvoltage event, melts to the gas tube 42 forming a metallized short circuit between the ground pin 46 and one or both of the signal pins 44 connected to the circuit board 36.

In various embodiments, the gas tube 42 is a gas discharge tube rated to meet electrical specifications of Underwriter's Laboratories, Telcordia, or another electrical safety specification appropriate to the region in which the plug 10 is used. Such gas discharge tubes can be any of a number of gas tubes manufactured by Bourns or other gas discharge tube manufacturer.

Referring now to FIGS. 9 and 11 specifically, a possible higher voltage application of the plug 10 requires use of a larger gas tube 42 so that high voltage telecommunications signals are allowed to pass by the plug 10 without causing the gas tube 42 to cause a short circuit. In such an embodiment, the gas tube selected may have a diameter wider than the distance between the inner portions of the side walls 26, 28, which define the width of the interior cavity 20 of the housing 12. To accommodate the gas tube 42, the side walls 26, 28 are thinned in a region 29 surrounding the gas tube 42.

As shown in FIGS. 9 and 10, the circuit board 36 is captured in a pocket 37 of housing portions 13. Once housing portions 13 are assembled together, the corners 39 of the circuit 36 are exposed through openings 21 for contacting electrical contacts of a connection block.

FIGS. 13-16 show a possible configuration of a circuit connection block assembly 100 according to the present disclosure. The circuit connection block assembly 100 provides a system for routing telecommunications signals among various telecommunications circuits in a high density interconnection structure. The block assembly 100 includes a connection block 102, a ground bar 104, and a plurality of overvoltage protection plugs 106. The connection block 102 includes an array of connection locations 103 used for telecommunications signal routing. The connection block 102 connects to a mounting frame 101, which provides a ground connection for the block, as well as a structure to which multiple blocks can be mounted. The connection block 102 includes rows 107 of insulation displacent contacts (IDC's) for connecting to signal wires. The connection blocks 102 can be any of a number of types of connection blocks generally referred to as Krone-style connection blocks. Example connection blocks are disclosed in U.S. Pat. Nos. 5,494,461; 5,163,855; 5,033,974; and 4,871,330, the disclosures of which are hereby incorporated by reference in its entirety.

The ground bar 104 extends across an array of connection locations, and includes a plurality of grounding extensions 105 corresponding to the plurality of connection locations 103, such that each grounding extension 105 corresponds to a connection location 103. The ground bar is discussed in greater detail below in FIGS. 23-28.

The overvoltage protection plugs 106 provide overvoltage protection to signals interconnected at the various connection locations 103 on the block 102. In a particular embodiment, the overvoltage protection plugs 106 correspond to the plug 10 as described above in conjunction with FIGS. 1-12. The overvoltage protection plugs 106 attach to the block 102 at the connection locations 103 and to the ground bar 104 at the grounding extensions 105. In the embodiment shown, the shape of the plug 106 is such that it will be accepted into a connection location 103 and will clip to a grounding extension 105 only in a particular orientation; that is, the grounding extensions 105 will block insertion of the plug 106 if a user attempts to insert the plug in a different orientation (i.e. upside down). As such, the circuit connection block assembly 100 provides a safety mechanism dictating unidirectional insertion of plugs 106 into connection locations 103 of the block 102.

In the configuration shown, when overvoltage protection plugs 106 are inserted into adjacent rows, a gap exists between the plugs, allowing wire routing between the blocks 102. It is therefore unnecessary to remove plugs 106 prior to routing wires along the block 102 to a connection location 103 in the same block in which the plugs 106 are inserted.

A punch down tool 108 is shown in use in conjunction with the assembly 100 to illustrate that the plugs 106 do not interfere with use of the tool 108 at connection locations 103 at rows 107 of IDC's adjacent to the plug 106, either in the same array of connection locations or in a neighboring array of connection locations. This ability to use a punch down tool exists at least in part due to the offset location of the handle extending rearwardly along the top edge of the plug. As described above, an example punch down tool is described in U.S. Pat. No. 4,434,542, the disclosure of which was previously incorporated by reference.

Referring now to FIGS. 17-22, the connection block assembly 100 is shown with overvoltage protection plugs 106 removed. In this configuration, the assembly 100 is shown having a single connection block 102 and associated ground bar 104. The connection block 102 mounts to the mounting frame 101 such that a portion of the frame 101 protrudes through the block 102. The ground bar 104 contacts the frame 101 when installed onto the block 102, providing a grounding connection. Grounding extensions 105 connect to electrical protection components, such as the overvoltage protection plugs 106, 10 which are inserted at the various connection locations 103 in the block 102.

FIGS. 23-28 illustrate in detail various aspects of the ground bar 104. The ground bar 104 attaches to the connection block 102 at opposed ends of the array of connection locations 103, such that the ground bar 104 contacts the mounting frame 101 protruding through the block 102 in a plurality of locations to stabilize the ground bar and to provide a high-current grounding connection. In the embodiment shown, the ground bar 104 electrically connects to the mounting frame 101 at four locations 109*a-d* on each side 108 of the ground bar 104. This allows a high-current connection to ground for the array of connection locations 103 on the block 102. More or fewer grounding connections between the ground bar 104 and the block 102 are possible as well. Bar 104 includes a split u-shaped end 112 with slot 113. Projection 110 fits into block 102 at opening 114.

It is noted that, although in the foregoing description of the overvoltage protection plug 10 and circuit connection block assembly 100, terms such as "upper", "top", "lower", "bottom", "front", "rear", and "side" and words related thereto are used for ease of description and illustration, no restriction is intended by use of such terms. The plug 10 and assembly 100 can be positioned in any orientation.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An overvoltage protection plug comprising:

a housing forming a body, a handle, and an insertion portion, the handle of the housing extending rearward from a top edge of the housing and the insertion portion extending from a generally central location of the front portion of the housing in a direction generally parallel to and offset from the handle;

a circuit board mounted at least partially within the body, a portion of the circuit board protruding from the housing at the insertion portion and including metallic connection pads configured for interconnection to a connection block;

a gas tube mounted to the circuit board and residing within the housing, the gas tube electrically connected to the metallic connection pads by a plurality of circuit traces on the circuit board; and a grounding clip positioned in an opening on the front portion of the housing and generally aligned with the handle, the grounding clip configured to connect to a grounding bar mounted to the connection block;

wherein the positions of the insertion portion and the grounding clip dictate insertion into the connection block in a single orientation.

2. The overvoltage protection plug of claim 1, wherein the housing includes an interior cavity having generally parallel side walls, the side walls defining a width of the interior cavity and each including a thinned region surrounding the gas tube.

3. The overvoltage protection plug of claim 1, wherein the housing is plastic.

4. The overvoltage protection plug of claim 1, wherein the housing includes a tool connection location configured to receive a punch-down tool.

5. The overvoltage protection plug of claim 1, wherein the circuit board extends substantially the entire length of the housing.

6. The overvoltage protection plug of claim 1, wherein the gas tube includes a melt element configured to create a short circuit in the instance of a prolonged overvoltage event.

7. The overvoltage protection plug of claim 1, wherein the grounding clip resides in an opening in the housing having beveled edges to facilitate insertion of a grounding extension of the grounding bar.

8. The overvoltage protection plug of claim 1, wherein the circuit board includes four or more circuit board layers.

9. An overvoltage protection plug comprising:

a housing forming a body, a handle, and an insertion portion, the handle of the housing extending rearward from a top edge of the housing and the insertion portion extending from a generally central location of the front portion of the housing in a direction generally parallel to and offset from the handle;

a circuit board mounted at least partially within the body, a portion of the circuit board protruding from the housing at the insertion portion and including metallic connection pads configured for interconnection to a connection block; and a gas tube mounted to the circuit board, the gas tube electrically connected to the metallic connection pads by a plurality of circuit traces on the circuit board; and a grounding clip positioned in an opening on the front portion of the housing and generally aligned with the handle, the grounding clip configured to connect to a grounding bar mounted to the connection block;

wherein the positions of the insertion portion and the grounding clip dictate insertion into the connection block in a single orientation, and wherein the body includes an interior cavity having generally parallel side walls, the side walls defining a width of the interior cavity and each including a thinned region surrounding the gas tube.

10. The overvoltage protection plug of claim 9, wherein the gas tube has a diameter larger than the distance between the side walls.

11. The overvoltage protection plug of claim 10, wherein the thinned region is configured to fit the gas tube in the interior cavity.

12. The overvoltage protection plug of claim 9, wherein the housing is plastic.

13. The overvoltage protection plug of claim 9, wherein the housing includes a tool connection location configured to receive a punch-down tool.

14. The overvoltage protection plug of claim 9, wherein the circuit board extends substantially the entire length of the housing.

15. The overvoltage protection plug of claim 9, wherein the circuit board includes four or more circuit board layers.

16. The overvoltage protection plug of claim 9, wherein the gas tube includes a melt element configured to create a short circuit in the instance of a prolonged overvoltage event.

17. A connection block assembly comprising:

a connection block including a plurality of circuit connection locations;

a ground bar attached to the connection block and including a plurality of grounding extensions corresponding to the plurality of circuit locations; and an overvoltage protection plug inserted at one of the plurality of connection locations, the overvoltage protection plug including:

a housing forming a body, a handle, and an insertion portion, the handle of the housing extending rearward from a top edge of the housing and the insertion portion extending from a generally central location of the front portion of the housing in a direction generally parallel to and offset from the handle;

a circuit board mounted at least partially within the body, a portion of the circuit board protruding from the housing at the insertion portion and including metallic connection pads configured for interconnection to a connection block;

a gas tube mounted to the circuit board and residing within the housing, the gas tube electrically connected to the metallic connection pads by a plurality of circuit traces on the circuit board; and a grounding clip positioned in an opening on the front portion of the housing and generally aligned with the handle, the grounding clip configured to connect to a grounding bar mounted to the connection block;

wherein the positions of the insertion portion and the grounding clip dictate insertion into the connection block in a single orientation.

18. The circuit connection block assembly of claim 17, wherein the grounding extensions extend upwardly from the connection block.

19. The circuit connection block assembly of claim 17, wherein the grounding clip resides in an opening in the housing having beveled edges to facilitate insertion of a grounding extension of the ground bar.

20. The circuit connection block assembly of claim 17, wherein the ground bar contacts a mounting frame at four or more points of electrical contact.

21. The circuit connection block assembly of claim 17, wherein the housing of the overvoltage protection plug includes an interior cavity having generally parallel side walls, the side walls defining a width of the interior cavity and each including a thinned region surrounding the gas tube.

22. The circuit connection block assembly of claim 17, wherein the position of the handle of the overvoltage protection plug accommodates insertion of a connection tool into one of the plurality of circuit connection locations adjacent to the overvoltage protection plug.

* * * * *